United States Patent [19]

Jankus

[11] Patent Number: 4,918,280
[45] Date of Patent: Apr. 17, 1990

[54] CLAMPING SLEEVE FOR BURNER ELECTRODES, ESPECIALLY FOR TIG BURNERS

[76] Inventor: Werner Jankus, Unterer Weg 6, D-4600 Dortmund 30, Fed. Rep. of Germany

[21] Appl. No.: 317,295

[22] Filed: Mar. 1, 1989

[30] Foreign Application Priority Data
Mar. 5, 1988 [DE] Fed. Rep. of Germany ... 8803019[U]

[51] Int. Cl.⁴ ............................................. B23K 9/28
[52] U.S. Cl. ...................................... 219/75; 219/138
[58] Field of Search ..................... 219/75, 136, 138

[56] References Cited
U.S. PATENT DOCUMENTS
4,461,948 7/1984 Watts .................................. 219/75

Primary Examiner—Clifford C. Shaw
Attorney, Agent, or Firm—Herbert Dubno

[57] ABSTRACT

A clamping sleeve for an electrode of a burner, especially a TIG burner, has its bore receiving the electrode offset from the axis of the housing receiving the sleeve so that, upon clamping of the electrode, the electrode is not only pressed against the wall of the bore over a greater part of its length, but is also pressed to the wall of a bore in the housing through which the electrode extends to increase the area over which electric current is delivered to and heat is abstracted from the electrode.

7 Claims, 2 Drawing Sheets

CLAMPING SLEEVE FOR BURNER ELECTRODES, ESPECIALLY FOR TIG BURNERS

FIELD OF THE INVENTION

My present invention relates to a clamping sleeve for an electrode of a burner, especially a tungsten inert gas or TIG burner and, more particularly, to a clamping sleeve of the type which has a bore traversed by the tungsten electrode, a compression surface which engages a set of a housing receiving the sleeve and against which the sleeve is pressed by a clamping cap threaded onto the housing, and which comprises the wall of the bore against the electrode to retain the electrode in place but permits relief of the compression force so that the electrode can be moved or replaced.

BACKGROUND OF THE INVENTION

Clamping sleeves for TIG burners generally are provided with slits at the clamping end adjacent the compression surfaces which may be cup-shaped or tapered, e.g. frustoconical, so that the axial slits define tongues which can be pressed against the electrode, usually a tungsten electrode.

Upon threading of the compression cap onto the clamping sleeve housing, the clamping end of the clamping sleeve is pressed by the conical or cup-shaped seat of the clamping sleeve housing inwardly against the electrode.

The electrode is thus held between the tongues. Upon loosening of the compression cap, the clamping force upon the electrode can be relieved and the electrode can be axially shifted to accommodate a variety of working conditions or can be replaced by another electrode.

The welding current is transferred from the clamping sleeve housing and the clamping sleeve, both of which are formed from highly conductive metals, to the electrode. Usually the welding current is applied to the electrode at a location close to the welding site and for this purpose, the throughgoing bore of the clamping sleeve may be stepped so that the electrode will come in contact with the tongues only over a limited portion of the length of the sleeve, i.e. the metallic contact is established substantially only at the ends of the tongues adjacent the compression surface and the seat.

As a consequence, the current density in the region of the seat of the sleeve housing and the ends of the tongues of the sleeve is especially high.

In addition, the thermal loading in this region is especially high even though tungsten, the electrode material, and copper or copper-tellurium alloys, the material from which the clamping sleeve and the sleeve housing are fabricated are good thermal conductors.

In spite of the good thermal conductivity of these materials, it is uncommon for the temperature at the clamping ends of the tongues to exceed allowable limits. As a consequence, undesirable deformations, twisting and distortions and even burn-off of the tongue ends can occur so that the clamping sleeve becomes unusable.

An improvement in the conduction of heat away from the limited contact zones is scarcely possible because of the small dimensions of the contact zones.

For similar reasons, cooling systems which are customarily used in the burner head in which the housing is received are generally not maximally effective at the end of the housing and sleeve at which maximum current transfer and maximum heat generation occur.

OBJECTS OF THE INVENTION

It is, therefore, the principal object of my invention to provide an improved clamping sleeve for use in a burner or torch of the type described, especially a TIG burner, so that the electric current and/or thermal loading of the clamping sleeve in the region of the clamping end thereof is reduced by comparison with earlier systems.

Another object of the invention is to provide an improved TIG burner or torch which can operate for longer periods without sleeve replacement and which does not involve additional investment to obtain the reduction of current and thermal loading.

SUMMARY OF THE INVENTION

These objects and others which will be apparent hereinafter are attained, in accordance with the invention in a clamping sleeve for a burner electrode, especially for a TIG burner, which comprises an elongated conductive body centered on a longitudinal axis thereof and formed with an abutment at one end thereof engageable by a compression cap and formed with a compression surface adapted to be pressed by the compression cap against a seat to compress the body against a burner electrode, the body being formed with a longitudinal throughgoing bore having at least an eccentric portion thereof adjacent the compression surface offset from the axis, the bore being traversed by the electrode and closefitting therearound whereby the eccentric portion, upon compression of the body against the electrode, distributes thermal contact between the electrode, and the body and a housing formed with the seat over a substantial length thereof.

A TIG burner of the invention can comprise:

an elongated tubular housing centered on a longitudinal axis and formed with a large-diameter bore open at one end of the housing and terminating at an opposite end of the housing in a small—diameter bore, a compression seat between the large-diameter bore and the small-diameter bore converging toward the axis in a direction toward the small-diameter bore, a first external thread on the housing proximal to the one end thereof, and a second external thread on the housing proximal to the opposite end thereof;

a compression cap threaded onto the first external thread, the tubular housing having generally radial passages opening outwardly from the large-diameter bore proximal to the seat;

a clamping sleeve received in the housing and having an elongated conductive body centered on the longitudinal axis and formed with an abutment at one end of the body engageable by the compression cap, the body being formed with a longitudinal throughgoing electrode-receiving bore having at least an eccentric portion thereof offset from the axis;

a tungsten electrode received in the electrode—receiving bore, closefittnngly surrounded by the electrode—receiving bore and extending completely through the sleeve and out of the small-diameter bore, the body being further formed at another end thereof with a compression surface adapted to be pressed by the compression cap against the seat to compress the body against the electrode whereby the eccentric portion, upon compression of the body against the electrode, distributes thermal contact between the electrode, the body and the housing over a substantial length thereof; and a nozzle threaded onto the second external thread, surrounding the electrode and discharging inert gas therearound.

Naturally the means for delivering the inert gas, applying the current and cooling the sleeve housing may also be provided but have not been mentioned and will not be illustrated since such means are conventional in the art.

According to the invention, therefore, the bore in the clamping sleeve traversed by the electrode is formed eccentrically, at least over a portion thereof and preferably the sleeve is circumferentially continuous, i.e. free from slits.

Upon compression of this clamping sleeve in the clamping sleeve housing, therefore, the conical or cup-shaped seat of the housing is used in accordance with the invention to compress the sleeve against the electrode.

However, because of the eccentricity of the bore, the electrode is no longer clamped just at the clamping end of the sleeve by the radial compression action, but is given a radial distortion which extends the length of the electrode into contact with the wall of the small-diameter bore of the housing traversed by the electrode as well.

The compression and lateral distortion which brings about the extended contact of the electrode with the sleeve and the housing is detected by the engagement between the frustoconical or cup-shaped compression surface of the sleeve and the correspondingly shaped seat of the housing when the compression cap axially braces the sleeve against the seat.

The eccentric arrangement of the electrode receiving bore, therefore, ensures that the electrode will be pressed against the wall of the small-diameter bore and an oppositely lying portion of the electrode-receiving bore with substantial force.

Since the electrode-receiving bore of the sleeve and the small-diameter bore of the housing receive the electrode with slight play, the electrode is free to move when the compression force of the cap is relieved, but provide a large-area metallic contact between the housing and the electrode on the one hand and the electrode and the sleeve on the other so that the delivery of the welding current to the electrode and the transmission of heat from the electrode are distributed over larger areas. The loading of the clamping end of the sleeve by the electric current and heat is thus significantly reduced.

The system has been found to have greater stability if the clamping end of the sleeve is not provided with longitudinal slits, in accordance with an important feature of the invention. As a consequence, the clamping sleeve has a longer useful life. In addition, the fabrication of the clamping sleeve is simpler because it can be made by simple turning and boring techniques. The sleeve can be made with greater tolerances because the clamping of the electrode is effected utilizing the eccentricity of the bore and thus the electrode will be clamped even if the bore of the sleeve and/or the bore of the housing pass the electrode with relatively large play.

The electrode-receiving bore can also be a stepped bore since it can suffice to only have the portion or section of the stepped bore at the mouth of the sleeve, i.e. adjacent the compression surface, eccentric. Of course both sections of the stepped bore can be eccentrically located.

Preferably the clamping end of the sleeve has an outer contour which corresponds to or is complementary to a conical or cup-shaped seat of the housing.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
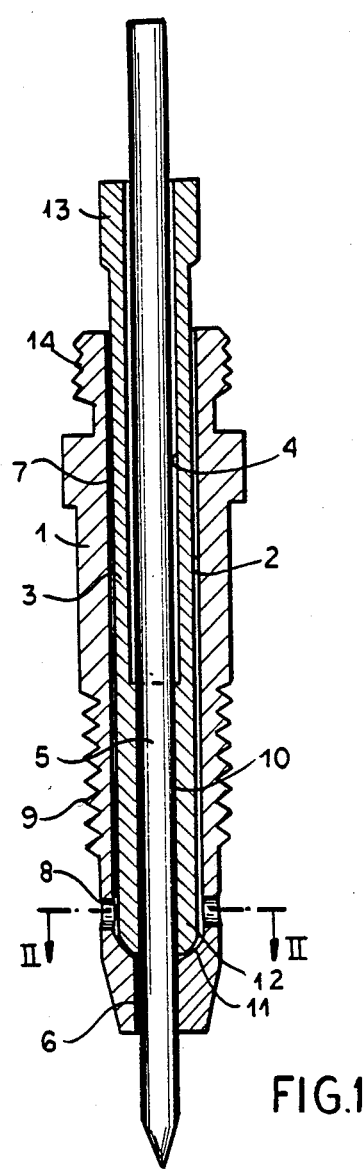
FIG. 1 is a longitudinal section of a clamping sleeve according to the invention, showing as well the housing for a TIG burner.
Figure 2:
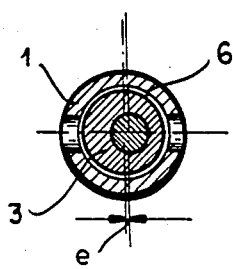
FIG. 2 is a cross sectional view taken along the line II—II of FIG. 1.

Referring first to FIGS. 1 and 2, it can be seen that the clamping-sleeve housing 1 can be provided in a TIG burner (not shown) formed with the usual means for feeding an inert gas such as argon to the housing and connecting the housing to a source of welding current.

Within a large-diameter bore section 2 of the housing 1, a clamping sleeve 3 can be received.

Figure 3:
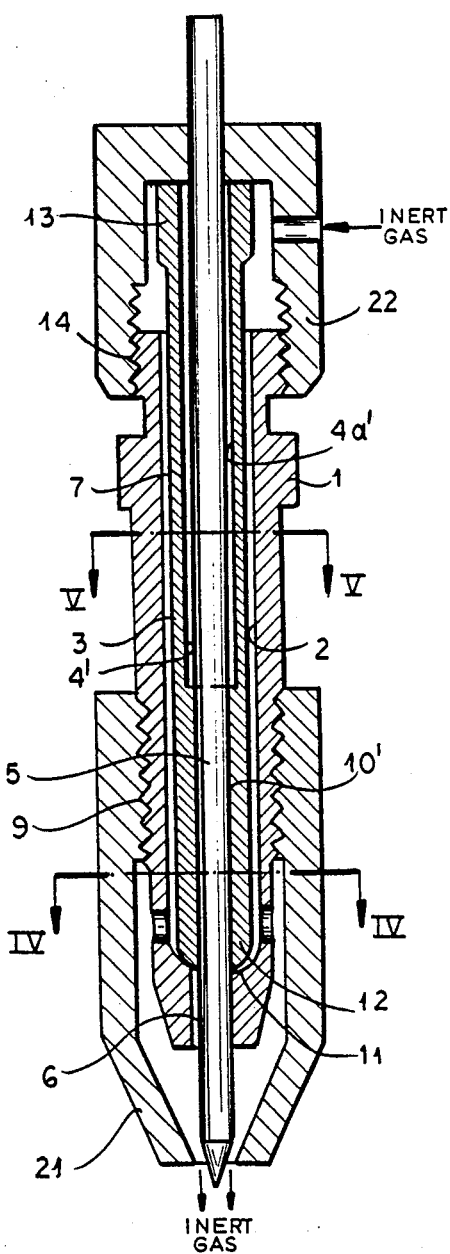
FIG. 3 is a view similar to FIG. 1 but illustrating another embodiment.

The clamping sleeve 3 can have a throughgoing bore 4 which, in the embodiment shown in FIG. 1 is not stepped, which in the embodiment of FIG. 3 is stepped so that only a small-diameter step at the lower end surrounds the electrode 5 with a minimum play. The large-diameter step of the bore 4 (FIG. 3) has its wall stepped radially from the electrode 5 by a greater distance than the minimum play.

Through the sleeve 3 in both embodiments, a respective electrode 5 extends, the electrode being constituted of tungsten in the usual case.

As can be seen from FIGS. 1 and 3 also the electrode 5 extends through the small-diameter bore 6 at the end of the housing 1. The housing 1 and the sleeve 3 can be composed of a copper-tellurium alloy.

The large-diameter bore 2 of the housing 1 has an inner diameter which is greater than the outer diameter of the sleeve 3 so that an annular passage 7 is formed between the housing and the sleeve for feeding a protective gas to the welding site, e.g. an inert gas such as argon as previously mentioned.

The protective gas emerges from the annular passage 7 via radial bores 8 formed in the housing 1 and from there the gas is directed to the welding site via a nozzle 21 as can be seen in FIG. 3. The nozzle 21, not shown in FIG. 1, is screwed onto the second external thread 9 of the housing 1.

The lower portion 10 of the bore 4 has an inner diameter which is only slightly greater than the outer diameter of the electrode 5 so that the latter is received in the lower portion 10 of the bore 4 with a limited play. The same applies for the small-diameter bore 6 at the lower end of the housing 1. The transition between the large-diameter bore 2 and the small-diameter bore 6 is formed by a seat 11 which can have the cup-shape contour or, as stated more generically, a contour which converges downwardly toward the axis of the housing.

The seat 11 cooperates with the nonslitted clamping end 12 of the sleeve 3 which, because of the lack of slits, is circumferentially continuous. The compression end 12 thus forms a compression surface which can have a contour which is complementary to that of the seat so that when the sleeve is forced axially into the seat, the clamping end 12 of the sleeve is compressed around the electrode.

As FIG. 2 shows, the bore 4 can be offset at least at its narrowest portion 10 from the axis and thus is eccentric. The eccentricity e can, depending upon a particular construction, be in the range of 0.1 to 1 mm.

To clamp the electrode 5 in the housing 1, the electrode 5 is fed through the sleeve 3 which can previously have been mounted in the housing.

A compression cap 22 can then be threaded onto the first external thread 14 of the housing as shown in FIG. 3 but not illustrated in FIG. 1 to press the sleeve 3 axially against the seat.

To this end, the sleeve 3 has an abutment 13 engageable by the cap.

The clamping end 12, being forced against the seat, radially clamps the electrode and, because of the eccentricity of the bore portion 10, also presses the electrode against a side of the bore 6. Even with a relatively low clamping pressure, the electrode 5 is held fast and engages both the sleeve 3 and the housing 1 over a substantial length of the electrode to distribute the electric current transfer area and the heat-transfer area over a significant portion of the length of the electrode.

Upon loosening of the cap 22, the electrode can be shifted in the axial direction and/or replaced by another electrode.

Figure 5:
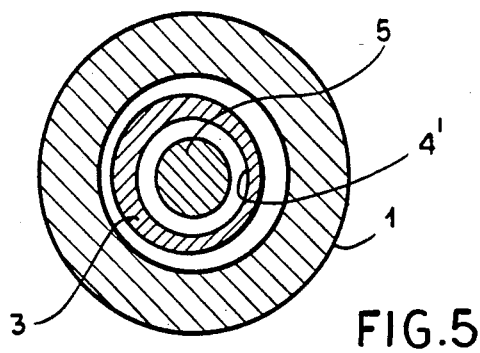
FIG. 5 is a view similar to FIG. 4 taken along the line V—V of FIG. 3.
Figure 4:
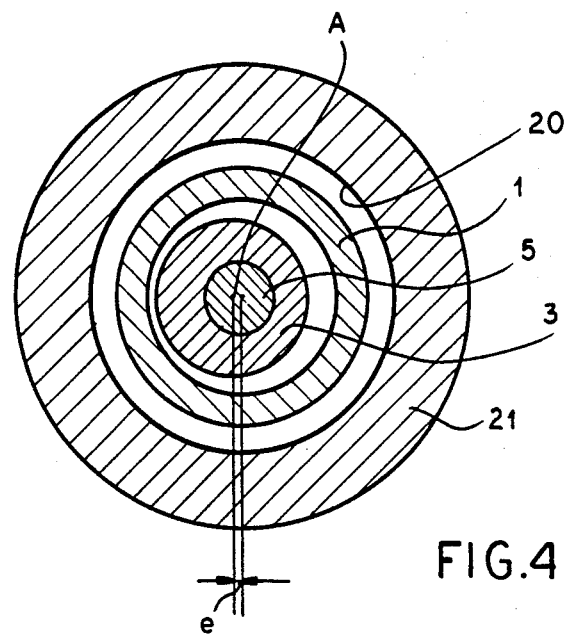
FIG. 4 is a cross sectional view taken along the line IV—IV of FIG. 3 but in enlarged to double the scale of FIG. 3.
Figure 6:
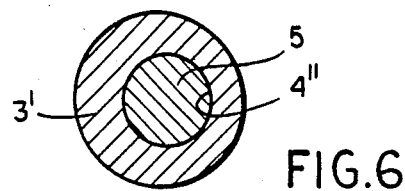
FIG. 6 is a sectional view through the electrode and the sleeve in the region corresponding to FIG. 5 of another embodiment in which the bore is eccentric over the entire length of the sleeve.

As FIGS. 3-5 show, the bore 4' may be stepped and both steps 4a' and 10' may be offset from the axis A of the housing by the eccentricity e. Of course, the large-diameter step 4a' can also be concentric with the axis if desired, and, as FIG. 6 illustrates, a bore 4' extending the full height of the sleeve may be eccentric not only in the region 10 as shown in FIG. 1, but also in the region in which the section corresponding to FIG. 5 was taken, quite remote from the clamping end.

I claim:

1. A TIG burner, comprising:
   an elongated tubular housing centered on a longitudinal axis and formed with a large-diameter bore open at one end of said housing and terminating at an opposite end of said housing in a small-diameter bore, a compression seat between said large-diameter bore and said small-diameter bore converging toward said axis in a direction toward said small-diameter bore, a first external thread on said housing proximal to said one end thereof, and a second external thread on said housing proximal to said opposite end thereof;
   a compression cap threaded onto said first external thread, said tubular housing having generally radial passages opening outwardly from said large-diameter bore proximal to said seat;
   a clamping sleeve received in said housing and having an elongated conductive body centered on said longitudinal axis and formed with an abutment at one end of said body engageable by said compression cap, said body being formed with a longitudinal throughgoing electrode-receiving bore having at least an eccentric portion thereof offset from said axis;
   a tungsten electrode received in said electrode-receiving bore, closefittingly surrounded by said electrode-receiving bore and extending completely through said sleeve and out of said small-diameter bore, said body being further formed at another end thereof with a compression surface adapted to be pressed by the compression cap against said seat to compress said body against said electrode whereby the eccentric portion, upon compression of said body against said electrode, distributes thermal contact between the electrode, said body and said housing over a substantial length thereof; and
   a nozzle threaded onto said second external thread, surrounding said electrode and discharging inert gas therearound.

2. The TIG burner defined in claim 1 wherein said compression surface and said compression seat are generally cup-shaped.

3. The TIG burner defined in claim 1 wherein said compression surface and said compression seat are generally frustoconical in shape.

4. The TIG burner defined in claim 1 wherein said body is a slit-free body and is circumferentially continuous.

5. The TIG burner defined in claim 4 wherein said bore is a stepped bore.

6. The TIG burner defined in claim 4 wherein only the portion of the stepped bore adjacent said compression surface is offset from said axis.

7. The TIG burner defined in claim 4 wherein all of the portions of the stepped bore are offset from said axis.

* * * * *